United States Patent
Li et al.

(10) Patent No.: US 10,009,444 B2
(45) Date of Patent: Jun. 26, 2018

(54) PROTOCOL REQUEST PROCESSING METHOD AND DEVICE USING THE SAME

(71) Applicant: Tencent Technology (Shenzhen) Company Limited, Shenzhen (CN)

(72) Inventors: Wei Li, Guangdong (CN); Helin Qiu, Guangdong (CN); Xiaofei Cheng, Guangdong (CN); Xuan Yu, Guangdong (CN); Zhiqiang He, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 362 days.

(21) Appl. No.: 14/657,753

(22) Filed: Mar. 13, 2015

(65) Prior Publication Data

US 2015/0195380 A1 Jul. 9, 2015

Related U.S. Application Data

(63) Continuation of application No. PCT/CN2014/082347, filed on Jul. 16, 2014.

(30) Foreign Application Priority Data

Nov. 4, 2013 (CN) .......................... 2013 1 0537740

(51) Int. Cl.
  *G06F 15/16* (2006.01)
  *H04L 12/16* (2006.01)
  *H04L 29/06* (2006.01)

(52) U.S. Cl.
  CPC .............. *H04L 69/08* (2013.01); *H04L 67/42* (2013.01); *H04L 69/18* (2013.01)

(58) Field of Classification Search
  CPC ... H04L 29/06; H04L 47/10; H04L 29/08072; H04L 29/06027; H04L 29/08117;
  (Continued)

(56) References Cited

U.S. PATENT DOCUMENTS 7,180,912 B1 * 2/2007 Samarasinghe ... H04L 29/06027
  370/395.5
7,283,537 B2 * 10/2007 Kametani ............... H04L 29/06
  370/401

(Continued)

FOREIGN PATENT DOCUMENTS

CN   102148844 A   8/2011
CN   102291416 A   12/2011

(Continued)

OTHER PUBLICATIONS

International Search Report dated Nov. 14, 2014 in International Application No. PCT/CN2014/082347.

(Continued)

*Primary Examiner* — Mahran Abu Roumi
(74) *Attorney, Agent, or Firm* — Brinks Gilson & Lione

(57) ABSTRACT

The present disclosure provides a server having a processor-readable storage medium comprising a set of instructions for protocol request processing; and a processor in communication with the storage medium. The processor is configured to execute the set of instructions to provide a communication with a customer terminal through an online platform; receive a second protocol request sent from the customer terminal; determine if the server is processing a first protocol request sent from the customer terminal prior to the second protocol request; process the second protocol request when the server is not processing the first protocol; and discard the second protocol request when the server is processing the first protocol.

10 Claims, 9 Drawing Sheets

(58) Field of Classification Search
CPC ........... H04L 29/08549; H04L 12/5695; H04L 47/15; H04L 47/2441; G06F 15/167; G06F 3/067; H04Q 11/0478
USPC .......................................................... 709/232
See application file for complete search history.

(56) References Cited

U.S. PATENT DOCUMENTS

| | | | | |
|---|---|---|---|---|
| 7,328,273 | B2* | 2/2008 | Nagoya | G06F 11/2043 370/390 |
| 8,260,907 | B2* | 9/2012 | O'Sullivan | H04L 41/0631 370/389 |
| 8,468,337 | B2* | 6/2013 | Gaur | H04L 9/0844 713/153 |
| 9,497,077 | B2* | 11/2016 | Yajima | H04L 43/0811 |
| 2005/0071254 | A1* | 3/2005 | Aboujaoude | G06Q 30/02 705/26.1 |
| 2006/0168277 | A1* | 7/2006 | Godse | H04L 67/20 709/230 |
| 2006/0173869 | A1* | 8/2006 | Byrne | G06F 21/6218 |
| 2007/0180533 | A1* | 8/2007 | Ramaiah | H04L 45/54 726/26 |
| 2008/0043674 | A1* | 2/2008 | Suh | H04W 36/0011 370/331 |
| 2008/0082707 | A1* | 4/2008 | Gupta | G06F 13/1615 710/110 |
| 2008/0102960 | A1* | 5/2008 | Jiao | A63F 13/12 463/42 |
| 2008/0220865 | A1* | 9/2008 | Hsu | A63F 13/08 463/37 |
| 2009/0197670 | A1* | 8/2009 | Kelly | G07F 17/3267 463/25 |
| 2010/0057999 | A1* | 3/2010 | Moyer | G06F 12/0831 711/146 |
| 2010/0089995 | A1* | 4/2010 | El-Awady | G06Q 20/14 235/375 |
| 2010/0254370 | A1* | 10/2010 | Jana | H04L 65/1016 370/352 |
| 2010/0279776 | A1* | 11/2010 | Hall | H04W 4/029 463/42 |
| 2010/0322258 | A1* | 12/2010 | Dynarski | H04W 88/16 370/401 |
| 2011/0202992 | A1* | 8/2011 | Xiao | G06F 21/33 726/10 |
| 2011/0242975 | A1* | 10/2011 | Zhao | H04L 29/12216 370/230 |
| 2013/0055287 | A1* | 2/2013 | Pope | G06F 9/546 719/314 |
| 2013/0282793 | A1* | 10/2013 | Swings | H04N 21/4227 709/203 |
| 2014/0029447 | A1* | 1/2014 | Schrum, Jr. | H04L 45/66 370/252 |
| 2014/0122715 | A1* | 5/2014 | Rowe | H04L 67/22 709/225 |

FOREIGN PATENT DOCUMENTS

| | | |
|---|---|---|
| CN | 102387206 A | 3/2012 |
| TW | M299416 U | 10/2006 |
| TW | I307231 B | 3/2009 |
| TW | 201015906 A | 4/2010 |
| WO | WO 00/41455 A2 | 7/2000 |

OTHER PUBLICATIONS

Written Opinion dated Nov. 14, 2014 in International Application No. PCT/CN2014/082347.

* cited by examiner

PROTOCOL REQUEST PROCESSING METHOD AND DEVICE USING THE SAME

PRIORITY STATEMENT

This application is a continuation of International Application No. PCT/CN2014/082347, filed on Jul. 16, 2014, in the State Intellectual Property Office of the People's Republic of China, which claims the priority benefit of Chinese Patent Application No. 201310537740.4 filed on Nov. 4, 2013, the disclosures of which are incorporated herein in their entirety by reference.

TECHNICAL FIELD

The present disclosure relates to computer communication technology field, and specifically, to a protocol request processing method and a device using the same.

BACKGROUND

In typical interactive technology of customer terminal and server, such as interactive communication between a customer terminal and a server during an online game, the customer terminal may send several protocol requests to the server at a same time, and then the server processes the several protocol requests together. Usually, the several protocol requests have relevance with each other. In order to adapt processing requirements of the protocol requests, the higher of the relevance of the several protocol requests, the more complicated of interactive logic of the server. For example, if a processing for a latter protocol request is based on a processing result of a previous protocol request, the server may need to add the interactive logic for caching the latter protocol request. When the processing for the previous protocol request is finished, the latter protocol request is then processed according to the processing result of the previous protocol request. Thus, the interactive logic in typical interactive technology is complicated, and has a higher maintenance cost.

SUMMARY

The present disclosure provides a protocol request processing method and a protocol request processing device, which may reduce a complexity of interactive logic, improve a stability of the interaction, and reduce a maintenance cost of the interactive logic.

According to an aspect of the present disclosure, a server may include a processor-readable storage medium comprising a set of instructions for protocol request processing; and a processor in communication with the storage medium. The processor may be configured to execute the set of instructions to provide a communication with a customer terminal through an online platform; receive a second protocol request sent from the customer terminal; determine if the server is processing a first protocol request sent from the customer terminal prior to the second protocol request; process the second protocol request when the server is not processing the first protocol; and discard the second protocol request when the server is processing the first protocol.

According to another aspect of the present disclosure, a computer-implemented method for protocol request processing may comprise providing a server in communication with a customer terminal through an online platform; receiving, by a server, a second protocol request sent from the customer terminal; determining, by the server, if the server is processing a first protocol request sent from the customer terminal prior to the second protocol request; processing, by the server, the second protocol request when the server is not processing the first protocol; and discarding, by the server, the second protocol request when the server is processing the first protocol.

According to yet another aspect of the present disclosure, a non-transitory processor-readable storage medium may comprise a set of instructions for protocol request processing, wherein the set of instructions, when executing by a processor of a server, directs the processor to perform acts of: providing the server in communication with a customer terminal through an online platform; receiving a second protocol request sent from the customer terminal; determining if the server is processing a first protocol request sent from the customer terminal prior to the second protocol request; processing the second protocol request when the server is not processing the first protocol; and discarding the second protocol request when the server is processing the first protocol.

Further description of present disclosure will be illustrated, which combined with embodiments in drawings and detailed embodiments, in order to make the purpose, the technical solution, and the advantages clear.

BRIEF DESCRIPTION OF THE DRAWINGS

The above and other features and advantages will become more apparent by describing in detail example embodiments thereof with reference to the attached drawings in which.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

Figure 1:
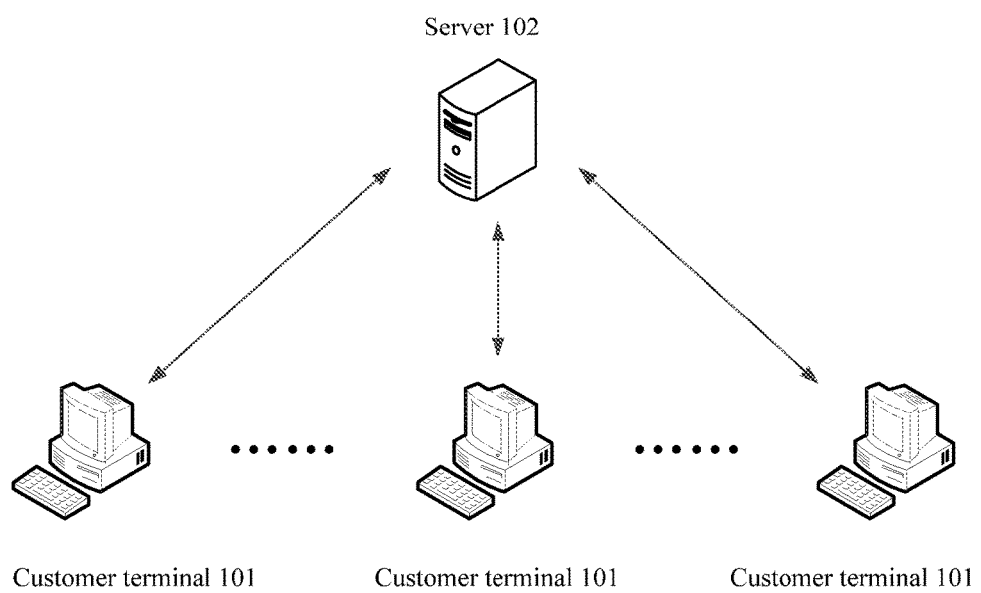
FIG. 1 is an application environment of a protocol request processing method according to an exemplary embodiment of present disclosure.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context FIG. 1 is an application environment of a protocol request processing method according to an exemplary embodiment of present disclosure. The application environment may be an online game platform or other online service platform. The application environment includes at least a customer terminal 101 and a server 102. The customer terminal 101 and the server 102 are connected by a wireless network or a cable network. The customer terminal 101 and the server 102 may connect and interact with each other through the wireless network or the cable network. Herein, the customer terminal 101 may be, but not limited to, a smart phone, a tablet computer, an e-book reader, a moving picture experts group audio layer III (MP3) player, a moving picture experts group audio layer IV (MP4) player, a laptop, a car personal computer, a desktop, etc.

Figure 8:
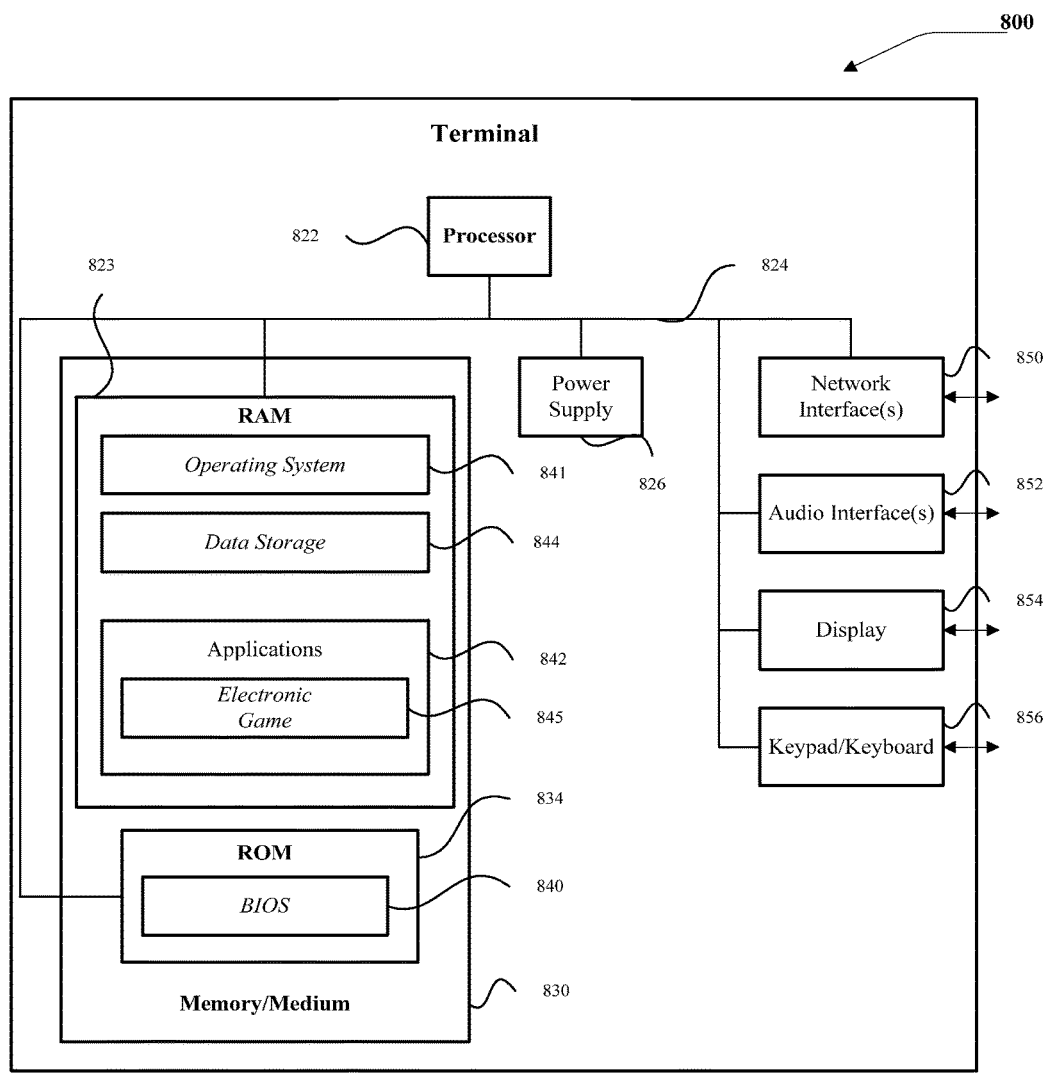
FIG. 8 is a schematic diagram illustrating an example embodiment of a customer terminal.

FIG. 8 is a schematic diagram illustrating an example embodiment of a customer terminal that may be implemented in the present disclosure. The customer terminal may include apparatuses to execute methods and software systems introduced in the present disclosure. A customer terminal 800 may be a computing device capable of executing a software system. The customer terminal 800 may, for example, be a device such as a personal desktop computer or a portable device, such as a laptop computer, a tablet computer, a cellular telephone, or a smart phone.

The customer terminal 800 may vary in terms of capabilities or features. Claimed subject matter is intended to cover a wide range of potential variations. For example, the customer terminal 800 may include a keypad/keyboard 856. It may also include a display 854, such as a liquid crystal display (LCD), or a display with a high degree of functionality, such as a touch-sensitive color 2D or 3D display. In contrast, however, as another example, a web-enabled customer terminal 800 may include one or more physical or virtual keyboards, and mass storage medium 830.

The customer terminal 800 may also include or may execute a variety of operating systems 841, including an operating system, such as a Windows™ or Linux™, or a mobile operating system, such as IOS™' Android™, or Windows Mobile™. The customer terminal 800 may include or may execute a variety of possible applications 842, such as an electronic game 845. An application 842 may enable communication with other devices via a network, such as communicating with another computer or content server via a network for online game.

Further, the customer terminal 800 may include one or more non-transitory processor-readable storage media 830 and one or more processors 822 in communication with the non-transitory processor-readable storage media 830. For example, the non-transitory processor-readable storage media 830 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 830 may store sets of instructions, or units and/or modules that include the sets of instructions, for conducting operations and/or method steps described in the present disclosure. Alternatively, the units and/or modules may be hardware disposed in the customer terminal 800 configured to conduct operations and/or method steps described in the present disclosure. The one or more processors may be configured to execute the sets of instructions and perform the operations in example embodiments of the present disclosure.

Figure 9:
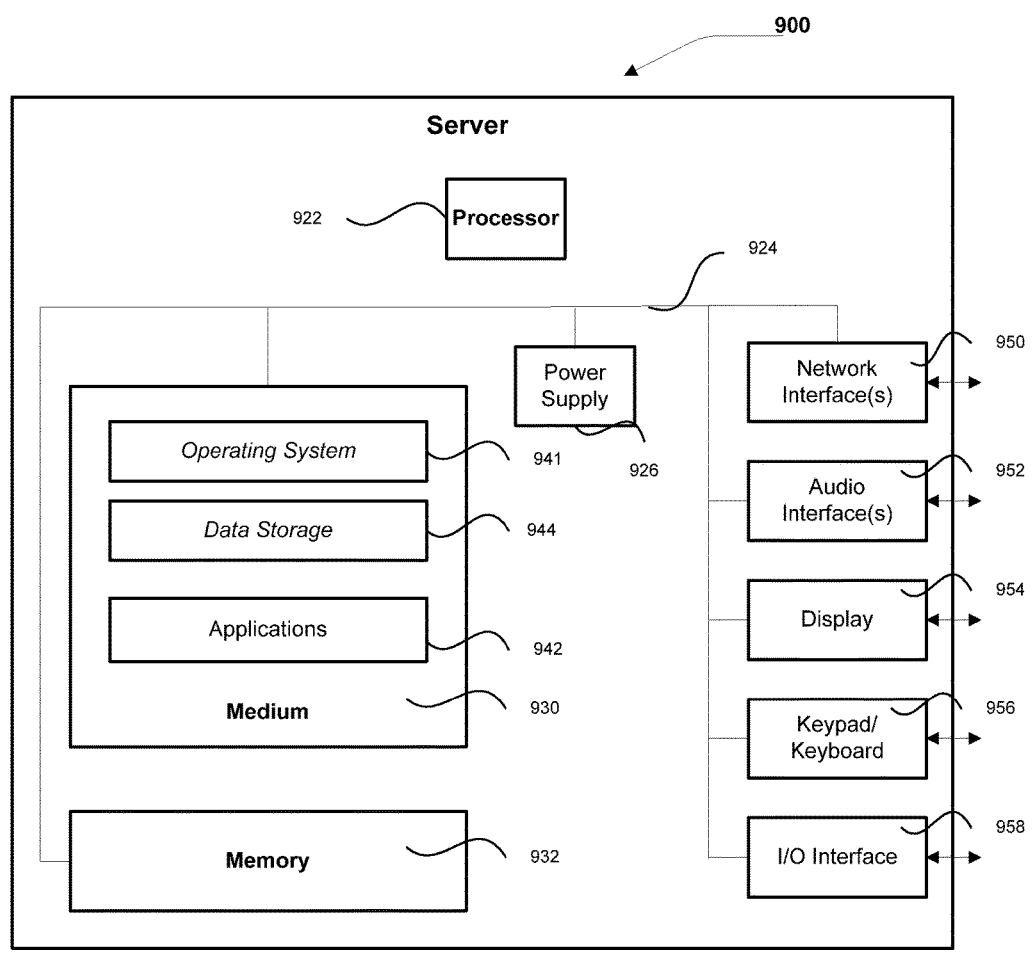
FIG. 9 is a schematic diagram illustrating an example embodiment of a server.

FIG. 9 is a schematic diagram illustrating an example embodiment of a server. The server 900 may be an online gaming service provider as described in the present disclosure and may connect to the customer terminal 800 locally or via a network. A Server 900 may vary widely in configuration or capabilities, but it may include one or more central processing units 922 and memory 932, one or more medium 930 (such as one or more mass storage devices) storing application programs 942 or data 944. The processing units 922 may execute the application programs 942 or data 944 to perform the operations in exemplary embodiments of the present disclosure.

The server 900 may further include one or more power supplies 926, one or more wired or wireless network interfaces 950, one or more input/output interfaces 958, and/or one or more operating systems 941, such as Windows Server™, Mac OS X™, Unix™, Linux™, FreeBSD™, or the like. Thus a server 900 may include, as examples, dedicated rack-mounted servers, desktop computers, laptop computers, set top boxes, mobile computational devices such as smart phones, integrated devices combining various features, such as two or more features of the foregoing devices, or the like.

The server 900 may provide a variety of services to the customer terminal 800, including, but are not limited to, web services, third party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor type or programmable consumer electronics, etc.

Merely for illustration, only one processor will be described in customer terminals that execute operations and/or method steps in the following example embodiments. However, it should be note that the customer terminals in the present disclosure may also include multiple processors, thus operations and/or method steps that are performed by one processor as described in the present disclosure may also be jointly or separately performed by the multiple processors. For example, if in the present disclosure a processor of a customer terminal executes both step A and step B, it should be understood that step A and step B may also be performed by two different processors jointly or separately in the customer terminal (e.g., the first processor executes step A and the second processor executes step B, or the first and second processors jointly execute steps A and B).

Figure 2:
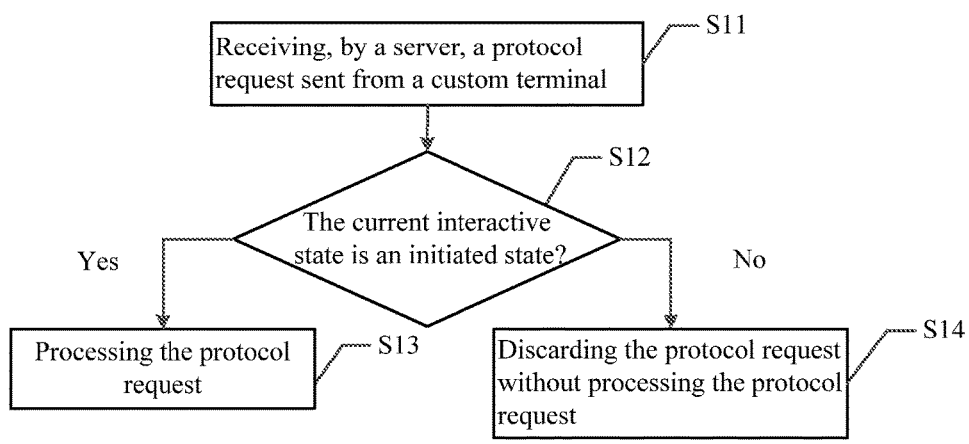
FIG. 2 is a flowchart of a protocol request processing method according to a first exemplary embodiment of present disclosure.

FIG. 2 is a flowchart of a protocol request processing method according to a first exemplary embodiment of present disclosure. Executing by a server 102, such as the server 900, the protocol request processing method may include at least the following steps.

Step S11, receiving, by the server, a protocol request sent from a custom terminal.

In this step, the customer terminal 101 sends the protocol request based on a protocol which is predetermined by the server 102 in advance. The protocol request is configured to obtain a preset service from the server 102. For example, the preset service may be a game service (e.g., online gaming service), an electronic service, a cyberspace service, a cyber community service, etc. For example, a protocol request for buying an item ("RequestBuyItem") in a game service may read as:

```
struct TRequestBuyItem
{
    BuyItemID;
    BuyItemCount;
};
``` where the term "BuyItemID" describes the item the customer terminal 101 wishes to buy and the term "BuyItemCount" describes the amount of the item that the customer terminal 101 wishes to buy.

The protocol request includes identification information of the customer terminal 101. The server 102 receives the protocol request sent from the customer terminal 101, and then based on the identification information of the customer terminal, the server 102 obtains an interactive state between the server 102 and the customer terminal 101 by querying interactive records between the server 102 and the customer terminal 101 stored locally in the server.

Wherein, the identification information of the customer terminal 101 may include, but not limited to, media access control (MAC) address, Internet Protocol (IP) address, or user account, etc.

Moreover, the interactive state between the server 102 and the customer terminal 101 may include, but not limited to, an initialized state and a protocol request state. The initialized state indicates that there is no interaction between the server 102 and the customer terminal 101 under a protocol request. In another word, the initialized state indicates that the sever 102 is not processing a protocol request sent from the customer terminal 101. The protocol request state indicates that the server 102 is interacting a protocol request with the customer terminal 101. In another word, the protocol request state indicated that the server 102 is processing the protocol request sent from the customer terminal 101.

Step S12, determining whether the interactive state between the server and the customer terminal is the initialized state.

When receiving a protocol request from the customer terminal 101, the server 102 determines whether its current interactive state with the customer terminal 101 is the initialized state. If the interactive state between the server and the customer terminal is the initialized state, the server 102 will execute Step S13 to process the protocol request sent from the customer terminal 101.

For example, when the interactive state between the server 102 and the customer terminal 101 is the initialized state, that is, the sever 102 is not processing a protocol request (or any protocol request) sent from the customer terminal 101, the server 102 allocates a computer process to the received protocol request, and processes the protocol request according to the computer process.

If the interactive state between the server 102 and the customer terminal 101 is not the initialized state, the server 102 will execute Step S14 to discard the received protocol request without processing the received protocol request.

For example, when the interactive state between the server 102 and the customer terminal 101 is not the initialized state (i.e., the server 102 is in the protocol request state), that is, the server 102 is processing another protocol request sent from the customer terminal 101, the server 102 then discards the received protocol request, and does nothing to the received protocol request.

In the protocol request processing method according to the exemplary embodiment of the present disclosure, when the server receives a protocol request sent from the customer terminal, the server determines whether to process the protocol request or to discard the protocol request according to the interactive state between the sever and the customer terminal. For a particular customer terminal, the server only process one protocol request sent from the customer terminal in at a time. The terminal will accept and process a second protocol request from the customer terminal only after finishing processing a first protocol request accepted from the same customer terminal before receiving the second protocol request. A currently processed protocol request will not be interrupted by another subsequently submitted protocol request from the same customer terminal. That is, only by the end of a current logic interaction between the customer terminal and the server, a subsequently next logic interaction between the customer terminal and the server will be processed.

Moreover, different customer interacts with the server in parallel and independently. Because the server interacts with each customer terminal independently, there is no interference between different customer terminals. Accordingly, the server are able to interact with several customer terminals at the same time (i.e., in parallel) but the complexity of the interactive logic is reduced, the stability of the interactive logic is improved, and the maintenance cost of the interactive logic is reduced.

Figure 3:
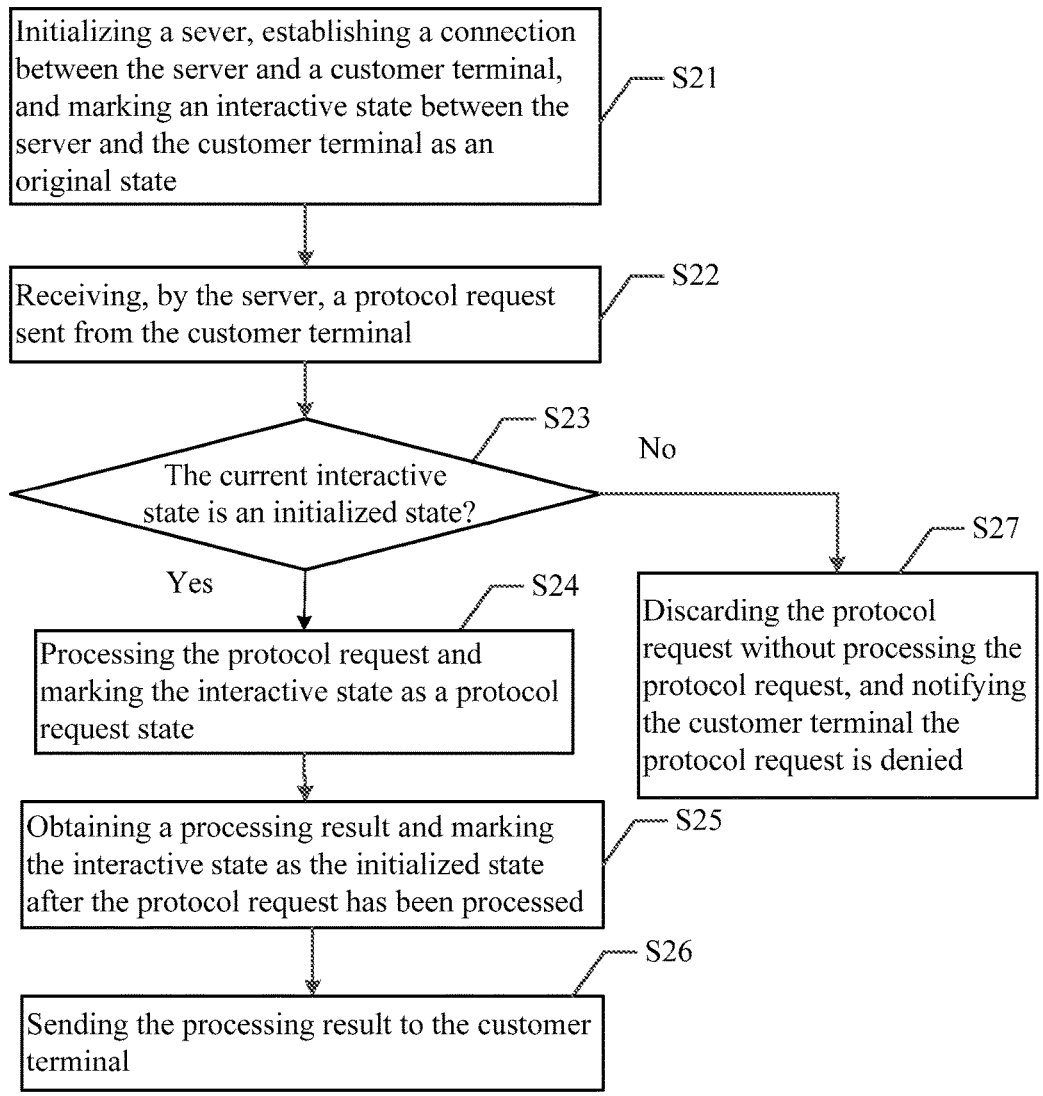
FIG. 3 is a flowchart of a protocol request processing method according to a second exemplary embodiment of present disclosure.

FIG. 3 is a flowchart of a protocol request processing method according to a second exemplary embodiment of present disclosure. Executing by a server, the method may include at least the following steps.

Step S21, initializing the server, establishing a connection between the server and a customer terminal, and marking an interactive state between the server and the customer terminal as an initialized state.

In this step, the server 102 is first initialized, and then receives a connection request from the customer terminal 101 after the initialization, and then establishes a connection with the customer terminal 101. Because in the current stage the server 102 only establishes the connection with the customer terminal 101 and have not yet accepted a protocol request therefrom, the server 102 may establish an interactive record document, such as an interactive log, for the customer terminal 101. The interactive record document is configured to record an identification of the customer terminal 101, an interactive state between the sever 102 and the customer terminal 101, and a corresponding relationship between the identification and the interactive state. Before the server 102 processing a protocol request for the customer terminal 101, the interactive state between the server 102 and the customer terminal 101 is marked as the initialized state in the interactive record document.

Step S22, receiving, by the server, a protocol request sent from the customer terminal.

Step S23, determining, by the server, whether the current interactive state between the server and the customer terminal is the initialized state.

Details of Steps S22 and S23 may respectively be similar to Steps S11 and S12 of the first exemplary embodiment as shown in FIG. 2.

If the interactive state between the server and the customer terminal is the initialized state, the server will execute Step S24 to process the protocol request and mark the interactive state as protocol request state.

In this step, when the interactive state between the server 102 and the customer terminal 101 is the initialized state, the server 102 allocates a computer process for the received protocol request sent from the customer terminal 101, processes the protocol request according to the process, and marks in the interactive record document the interactive state corresponding to the identification of the customer terminal 101 as a protocol request state.

Step S25, obtaining, by the server, a processing result and marking the interactive state as the initialized state after the protocol request has been processed.

In this step, when the server 102 detects that the protocol request has been processed, for example, when the server 102 detects the process for processing the protocol request is completed and/or logged off, the server 102 obtains the processing result of the protocol request, and marks the interactive state corresponding to the identification of the customer terminal 101 as the initialized state in the interactive record document.

Step S26, sending the processing result to the customer terminal.

If the interactive state between the server and the customer terminal is not the initialized state, the server executes Step S27 to discard and/or deny the protocol request without processing the protocol request, and notifies the customer terminal the protocol request is denied.

In this step, when the interactive state between the server 102 and the customer terminal 101 is not the initialized state, that is, the server 102 is processing a previous protocol request sent from customer terminal 101, or, the server 102 is processing another protocol request sent from the customer terminal 101, the sever 102 then discards and/or deny the protocol request which is received this time, notifies the customer terminal 101 the protocol request which is received this time is discarded and/or denied, and does nothing to the protocol request.

Accordingly to the exemplary embodiment, if the interactive state between the sever 102 and the customer terminal 101 is not the initialized state, the server 102 discards and/or denies the protocol request, records handling information (such as, receiving time of the protocol request, identification information, etc.) of the protocol request, and marks processing state of the protocol request as a discarded state in the interactive record document. When the server 102 receives a processing state querying request including identification of the protocol request sent from the customer terminal 101, the server 102 obtains corresponding processing state according to the identification querying record of the protocol request, and sends the obtained processing state to the customer terminal 101.

Figure 4:
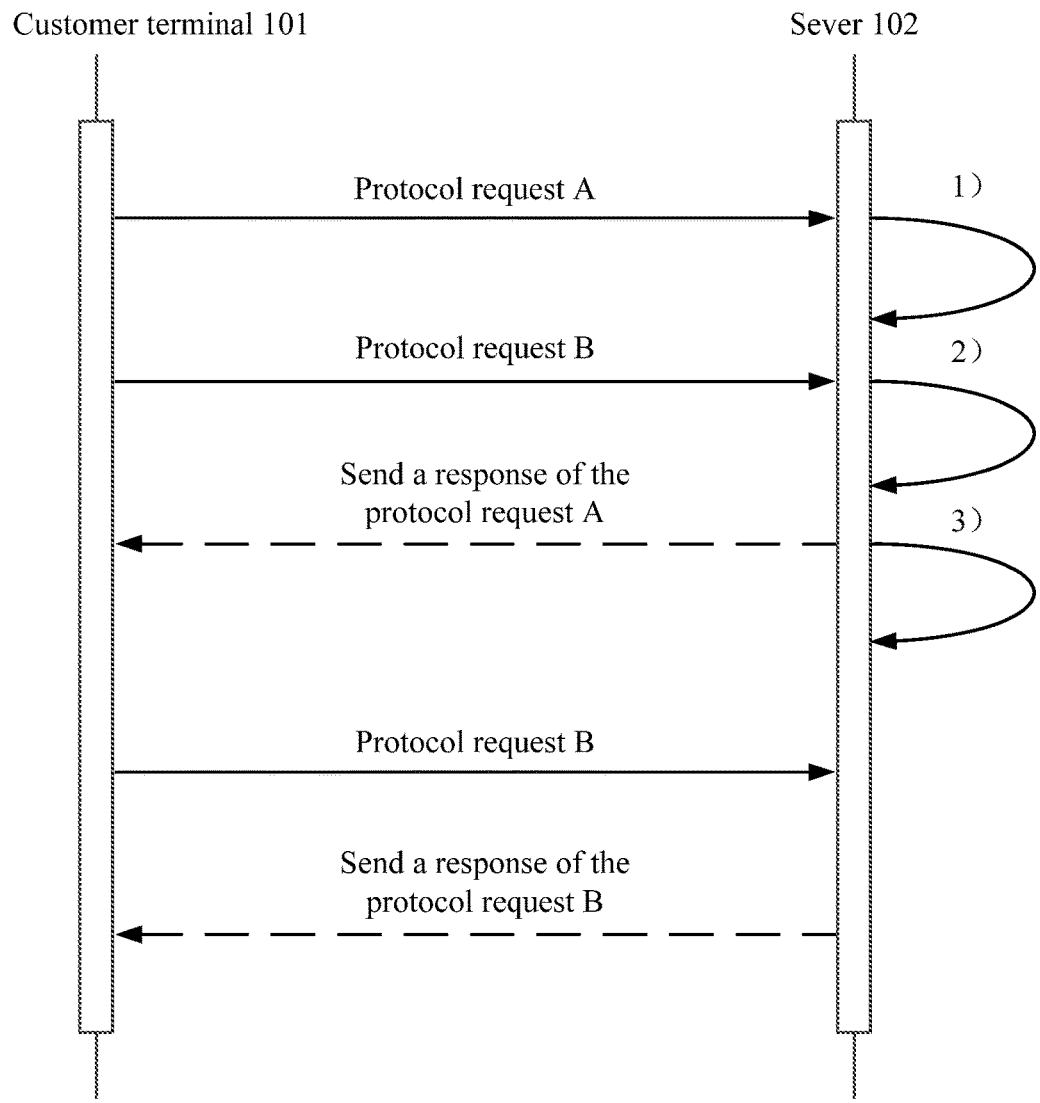
FIG. 4 is a sequence diagram of the protocol request processing method according to the second exemplary embodiment of present disclosure.

FIG. 4 is a sequence diagram providing a further description of the protocol request processing method according to the second exemplary embodiment of present disclosure. Assuming that the customer terminal 101 is a game client, the server 102 is a game server. The server 102 may provide a variety of preset business services, such as game service, e-commerce service, to the customer terminal 101 at the same time.

Step 1): the server 102 first receives a connection request sent from the customer terminal 101. In responding to the connection request, the server 102 establishes a connection with the customer terminal 101, initializes the interactive state between the server 102 and the customer terminal 101 to an initialized state. The server 102 then receives a protocol request A sent from the customer terminal 101, distributes process for the protocol request A, processes the protocol request A according to the process, and resets the interactive state between the server 102 and the customer terminal 101 to a protocol request state A. That is, the interactive state between the server 102 and the customer terminal 101 is reset to be the protocol request state A, which means the server 102 is processing the protocol request state A of the customer terminal 101.

Step 2): the server 102 receives a protocol request B sent from the customer terminal 101, obtains the interactive state between the server 102 and the customer terminal 101 to be protocol request A state according to the user account information included in the protocol request B. Accordingly, the server determines 102 that the server 102 has not yet finished processing the protocol request A previously sent by the customer terminal 101. In another word, the server 102 has not yet sent a response of the protocol request A to the customer terminal 101. Thus, the server 102 denies and/or discards the protocol request B. After the server 102 denies and/or discards the protocol request B, the server 102 notifies the customer terminal 101 that the protocol request B has been denied and/or discarded according to a preset rule. This preset rule prevents the customer terminal 101 from constantly sending protocol request B to the server 101 when the customer terminal 101 fails to receive the response of the protocol request more than a predetermined time. The present rule help the sever 102 avoid from system crashes caused by receiving too many protocol requests.

Step 3): when the processing of protocol request A is finished, the server 102 sends the response of the protocol request A to the customer terminal 101. In another word, the server 102 feeds the processing result back to the customer terminal 101. At the same time, the interactive state between the server 102 and the customer terminal 101 is reset to the initialized state.

After that, the server 102 receives the protocol request B including the user account information and sent from the customer terminal 101. Because the current inactive state between the server 102 and the customer terminal 101 is the initialized state according to the user account information, the server 102 processes the protocol request B. After finishing the process, the server 102 sends the response of the protocol request B to the customer terminal 101. During the period, the server 102 dynamically resets the interactive state between the server 102 and the customer terminal 101 according to the process of the protocol request B, so as to make sure that the server 102 only processes a protocol request sent from the customer terminal 101 at a time. Thus, the complexity of the interactive logic is reduced, and the maintenance cost of the interactive logic is reduced. To process a protocol request that was previously discarded, the customer terminal 101 may need to resend the protocol request to the server 102. The server 102 may not pick up a discarded protocol request.

Figure 5:
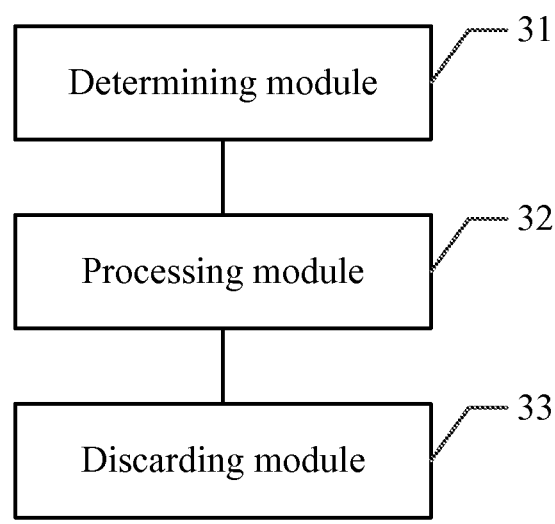
FIG. 5 is a schematic diagram of a protocol request processing device according to a third exemplary embodiment of present disclosure.

FIG. 5 is a schematic diagram of a protocol request processing device according to a third exemplary embodiment of present disclosure. The protocol request processing device may implement the protocol request processing methods of the above embodiments. The protocol request processing device 30 includes a determining module 31, a processing module 32, and a discarding module 33.

The determining module 31 is configured to receive a protocol request sent from a customer terminal and determine whether the interactive state between the server and the customer terminal is the initialized state.

The processing module 32 is configured to process the protocol request, when the determining module 31 determines that the interactive state between the server and the customer terminal is the initialized state.

The discarding module 33 is configured to deny and/or discard the protocol request without processing the protocol request when the determining module 31 determines the interactive state between the server and the customer terminal is not the initialized state.

The detail process of realizing functions of each module of the protocol request processing device 30 may refer to FIG. 1 to FIG. 4.

Figure 6:
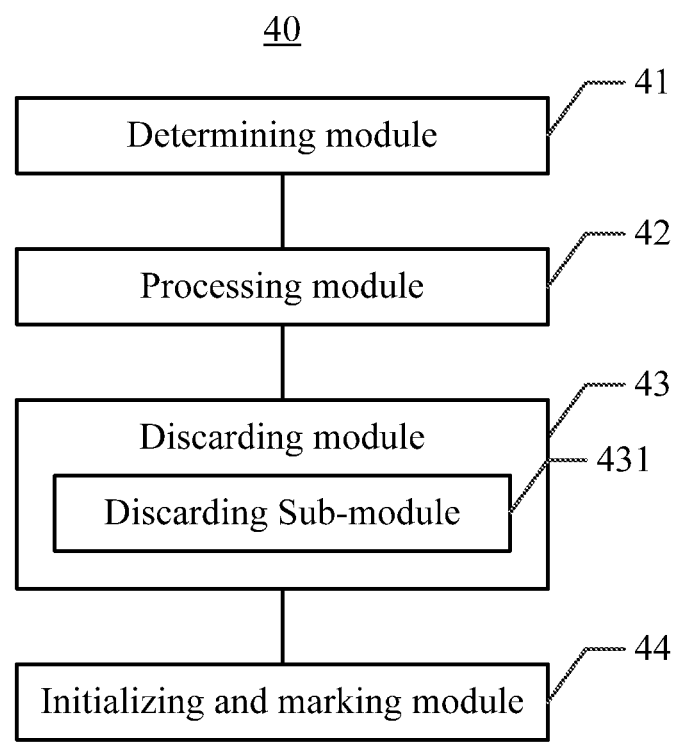
FIG. 6 is a schematic diagram of a protocol request processing device according to a fourth exemplary embodiment of present disclosure.

FIG. 6 is a schematic diagram of a protocol request processing device according to a fourth exemplary embodiment of present disclosure. The protocol request processing device may implement the protocol request processing methods of the above exemplary embodiments. As shown in FIG. 6, the protocol request processing device 40 may include a determining module 41, a processing module 42, a discarding module 43, and an initializing and marking module 44.

The determining module 41 is configured to receive a protocol request sent from a custom terminal and determine whether an interactive state between the server and the customer terminal is the initialized state.

Figure 7:
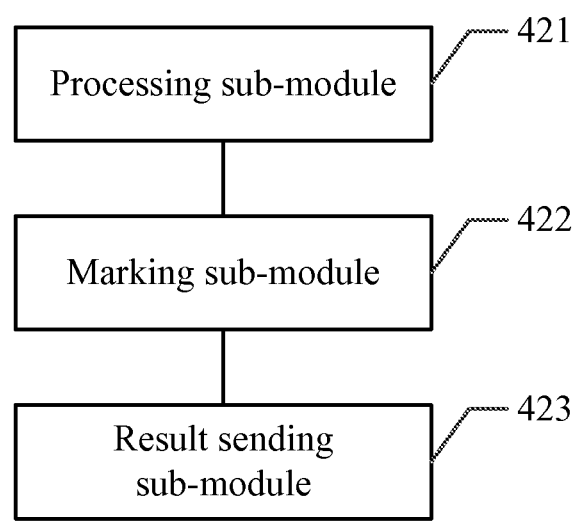
FIG. 7 is a schematic diagram of some modules of the protocol request processing device according to the fourth exemplary of present disclosure.

The processing module 42 is configured to process the protocol request, when the determining module 41 determines the interactive state between the server and the customer terminal is the initialized state. As shown in FIG. 7, the processing module 42 includes a processing sub-module 421, a marking sub-module 422, and a result sending sub-module 423. The processing sub-module 421 is configured to process the protocol request and mark the interactive state as protocol request state, when the determining module 41 determines the interactive state between the server and the customer terminal is the initialized state. The marking sub-module 422 is configured to obtain a processing result and making the interactive state as the initialized state after the protocol request has been processed by the processing sub-module 421. The result sending sub-module 423 is configured to send the processing result to the customer terminal.

The discarding module 43 is configured to deny and/or discard the protocol request without processing the protocol request when the determining module 41 determines the interactive state between the server and the customer terminal is not the initialized state. The discarding module 43 includes a discarding sub-module 431. The discard sub-module 431 is configured to deny and/or discard the protocol request without processing the protocol request, and notifying the customer terminal the protocol request is denied and/or discarded, when the determining module 41 determines the interactive state between the server and the customer terminal is not the initialized state. Or, when the determining module 41 determines the interactive state between the server and the customer terminal is not the initialized state, the discarding sub-module 431 is configured to deny and/or discard the protocol request, mark processing state of the protocol request as denied and/or discarded. The discard sub-module 431 is further configured to send the processing state of the protocol request to the customer terminal, when receiving a processing state querying request sent from the customer terminal.

The initializing and marking module 44 is configured to initialize the server, establish a connection between the server and the customer terminal, and mark the interactive state between the server and the customer terminal as initialized state.

In the exemplary embodiment of present disclosure, a detail process of realizing the functions of the modules of the protocol request processing device 40 may refer to FIG. 1 to FIG. 4.

Accordingly, the exemplary embodiments of the present disclosure provide protocol request processing devices of a server to executing protocol requests sent from a customer terminal. When the server receives the protocol request sent from the customer client, processing the protocol request or discarding the protocol request is determined according to the interactive state between the sever and the customer terminal. During a period of time, the server only process one protocol request sent from the same customer terminal. That is, only by end of a current logic interaction between the customer terminal and the server, a subsequently logic interaction between the customer terminal and the server will be responded by the server.

Moreover, different customer interacts with the server in parallel and independently. Because the server interacts with each customer terminal independently, there is no interference between different customer terminals. Accordingly, the server are able to interact with several customer terminals at the same time (i.e., in parallel) but the complexity of the interactive logic is reduced, the stability of the interactive logic is improved, and the maintenance cost of the interactive logic is reduced It is important to point that the exemplary embodiments of present disclosure are described in a progressive way. It is also important to point that the part of one embodiment which is different from the part of the other embodiment is described in detail. And the same parts of the embodiments may be referred to each other. The embodiments of the device are similar to the embodiments of the method, so the embodiments of the device are described simply. The corresponding part of the device may refer to the content of the method.

It is also to point that the terms such as "the first", "the second" are only to distinguish one entity or operation from other entity or operation. It is not means that the entities or the operations having an actual relationship or order. Moreover, the terms "include", "comprise", synonym of the terms, and deformations of the terms have non exclusive meanings. Thus, a procedure, a method, an article or a device includes a series of components means they not only includes the series of components but also includes other components which are not list, or also includes other fixed components. Without other limitation, a procedure, a method, an article or a device include a component which is formed by a term "includes a . . . " or "comprises a . . . " does not exclude other components.

It is understood to a person having ordinary skill in the art that all of or part of the steps of the methods of the above embodiments may be realized by hardware or be realized by software production. The software is configured to instruct corresponding hardware to implement the method described in the embodiment of present disclosure. The software production is stored in computer readable storage medium. The computer readable storage medium may be read only memory (ROM), magnetic disk, or compact disk (CD).

Thus, exemplary embodiments illustrated in FIGS. 1-7 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A computer-implemented method for protocol request processing, comprising:
    communicating, by a server, with a first game instance executed on a first terminal and a second game instance executed on a second terminal through an online platform;
    storing, in a memory, an interactive record including a first interactive state corresponding to the first terminal and a second interactive state corresponding to the second terminal, the first interactive state and the second interactive state each assignable, by the server, to at least one of a protocol request state or an initialized state;
    initializing the server;
    establishing a first connection between the server and the first terminal through the online platform, wherein the online platform is an online game;
    establishing a second connection between the server and the second terminal through the online platform;
    assigning, in response to initialization of the server, the first interactive state between the server and the first terminal to an initialized state and a second interactive state between the server and the second terminal to the initialized state;
    receiving, by the server from the first terminal, a plurality of protocol requests of the first game instance and a protocol request of the second game instance;
    assigning, by the server, the first interactive state to the protocol request state in response to receipt of at least one of the protocol requests of the first game instance;
    assigning, by the server, the second interactive state to the protocol request state in response to receipt of the protocol request of the second game instance;
    processing, by the server based on a protocol of a game, in response to assignment of the first interactive state to the protocol request state, the protocol requests of first game instance in serial by:
        executing the protocol of the game according to a first one of the protocol requests of the first game instance,
        discarding, in response to assignment of the first game instance to the protocol request state, a second one of the protocol requests of the first game instance,
        updating a processing state of the second one of the protocol requests as discarded,
        receiving a processing state query request created by the first game instance and sent by the first terminal, and
        transmitting, from the server to the first terminal, in response to receipt of the processing state query request, a notification message indicating that the second one of the protocol requests was discarded, the notification message comprising the processing state of the second one of the protocol requests; and
    processing, in response to assignment of the second interactive state to the protocol request state, the protocol request of the second game instance concurrent with processing the protocol requests of the first game instance in serial.

2. The computer-implemented method according to claim 1, wherein the online game is based on the protocol of the game, the protocol of the game implemented on the server.

3. A computer implemented method, comprising:
    communicating, by a server, through an online platform, with a first terminal remote to the server and a second terminal remote to the server, a first game instance configured on the first terminal and a second game instance configured on the second terminal;
    storing, in a memory, an interactive record, the interactive record including a first interactive state corresponding to the first game instance configured on the first terminal and a second interactive state corresponding to the second game instance configured on the second terminal, the first interactive state and the second interactive state each assignable, by the server, to at least one of a protocol request state or an initialized state;
    initializing the server;
    assigning, in response to initialization of the server, the first interactive state between the server and the first terminal to the initialized state and a second interactive state between the server and the second terminal to the initialized state;
    executing, by the server, a game according to a protocol of the game;
    receiving, by the server, a first protocol request and a second protocol request created by the first game instance and sent from the first terminal, the first protocol request and the second protocol request corresponding to the protocol of the game; and
    processing, by the server, the first protocol request and the second protocol request in serial by:
        identifying a first interactive state corresponding to the server and the first game instance configured on the first terminal,
        updating the first interactive state from an initialized state to the protocol request state,
        executing, by the server, the protocol of the game according to the first protocol request created by the first game instance,
        discarding the second protocol request in response to receipt of the second protocol request and the first interactive state being the protocol request state;

updating the first interactive state to the initialized state in response to completion of processing the protocol of the game according to the first protocol request, receiving, from the first terminal, a processing state query request created by the first game instance, and sending the first interactive state to the first terminal in response to receiving the processing state query request, the first game instance configured to resend the second protocol request in response to the first interactive state being updated to the initialized state;

receiving, from the second terminal, a third protocol request created by the second game instance configured on the second terminal;

processing, in response to the second interactive state updated to the protocol request state, the third protocol request of the second game instance in parallel with processing the first protocol request and the second protocol request in serial.

4. The computer implemented method of claim 3, wherein processing the first protocol request and the second protocol request further comprises the steps of:
receiving the second protocol request resent from the first game instance; and
processing the second protocol request received from the first game instance in response to receipt of the second protocol request resent from the first game instance and the first interactive state being the initialized state.

5. The computer implemented method of claim 4, wherein processing the first protocol request and the second protocol request further comprises the steps of:
updating the first interactive state to the protocol request state in response to processing the second protocol request;
obtaining a processing result associated with the second protocol request;
updating the first interactive state as an initialized state after the second protocol request has been processed; and
sending the processing result associated with the second protocol request to the first terminal.

6. The computer implemented method of claim 3, wherein the step of discarding of the second protocol request further comprises:
ignoring the second protocol request without processing the protocol of the game according to the second protocol request; and
notifying the first terminal that the second protocol request is discarded.

7. The computer implemented method of claim 3, storing a plurality of processing states corresponding to respective protocol requests received by the server, wherein the step of discarding of the second protocol request further comprises:
updating a processing state corresponding to the second protocol request as discarded;
receiving a processing state query request sent from the first terminal; and
sending the processing state corresponding to the second protocol request to the first terminal in response to receipt of the processing state querying request sent from the first terminal.

8. A server, comprising: a non-transitory computer readable storage medium comprising a set of instructions; and a processor in communication with the non-transitory computer readable storage medium configured to execute the set of instructions to:

communicate, terminal through an online platform, with a first game instance executed on a first terminal and a second game instance executed on a second terminal;
store, in a memory, an interactive record including a first interactive state corresponding to the first terminal and a second interactive state corresponding to the second terminal, the first interactive state and the second interactive state each assignable, by the processor, to at least one of a protocol request state or an initialized state;
establish a first connection between the server and the first terminal through the online platform, wherein the online platform is an online game;
establish a second connection between the server and the second terminal through the online platform;
assign the first interactive state between the server and the first terminal to the initialized state and a second interactive state between the server and the second terminal to the initialized state;
receive, from the first terminal, a plurality of protocol requests created by the first game instance and a protocol request created by the second game instance;
assign, by the server, the first interactive state to the protocol request state in response to receipt a least one of the protocol requests created by the first game instance;
assign the second interactive state to the protocol request state in response to receipt of the protocol request created by the second game instance;
process in response to assignment of the first interactive state to the protocol request state, the protocol requests of the first game instance in serial, wherein to process the protocol requests of the first game instance in serial, the processor is further configured to execute the set of instructions to:
execute a protocol of the game according to a first one of the protocol requests created by the first game instance,
discard, in response to assignment of the first game instance to the protocol request state, a second one of the protocol requests created by the first game instance,
update a processing state of the second one of the protocol requests as discarded,
receive a processing state query request created by the first game instance and sent by the first terminal, and
transmit, from the server to the first terminal, in response to receipt of the processing state query request, a notification message indicating that the second one of the protocol requests created by the first game instance was discarded, the notification message comprising the processing state of the second one of the protocol requests; and
process, in response to assignment of the second interactive state to the protocol request state, the protocol request of the second game instance concurrent with processing the protocol requests of the first game instance in serial.

9. The server according to claim 8, wherein the processor is further configured to execute the set of instructions to:
receive a connection request from the first game instance executed on the first terminal; and
associate, in the interactive record, in response to the connection request, the first interactive state with the first terminal.

10. The server according to claim 8, wherein to discard the second one of the protocol requests, the processor is further configured to execute the set of instructions to:
  ignore the second one of the protocol requests; and
  transmit a message to the first terminal, the message indicating that the second one of the protocol requests is discarded.

* * * * *